United States Patent [19]

Tornquist

[11] 4,364,709
[45] Dec. 21, 1982

[54] WIND POWER CONVERTER

[76] Inventor: August Tornquist, 125 Barclay Ave., Staten Island, N.Y. 10312

[21] Appl. No.: 331,523

[22] Filed: Dec. 30, 1981

[51] Int. Cl.³ .............................................. F03D 3/06
[52] U.S. Cl. ............................ 416/132 B; 416/197 A
[58] Field of Search .......... 416/197 A, 240 A, 132 B, 416/200 R, 200 A; 290/55, 44, 54

[56] References Cited

U.S. PATENT DOCUMENTS

| | | | |
|---|---|---|---|
| 22,623 | 1/1859 | Butterfield | 416/132 B X |
| 196,448 | 10/1877 | Harris | 416/197 A X |
| 260,085 | 6/1882 | Coloney | 416/240 A X |
| 330,168 | 11/1885 | Tallerday | 416/132 B X |
| 459,184 | 9/1891 | Hawkins | 416/197 A |
| 589,530 | 9/1897 | Knowlton | 416/119 |
| 625,614 | 5/1899 | Thompson | 416/197 A X |
| 854,652 | 5/1907 | Kinney | 416/197 A X |
| 1,359,180 | 11/1920 | Levesque | 416/197 A X |
| 1,578,835 | 3/1926 | Kothe | 416/197 A X |
| 1,734,858 | 11/1929 | Keller | 416/197 A X |
| 2,159,653 | 5/1939 | Carlin | 416/197 A X |
| 3,127,094 | 3/1964 | Smith | 416/200 A X |
| 3,887,817 | 6/1975 | Steelman | 416/197 A X |
| 4,019,828 | 4/1977 | Bunzer | 416/197 A X |
| 4,329,593 | 5/1982 | Willmouth | 416/197 A X |

*Primary Examiner*—Everette A. Powell, Jr.
*Attorney, Agent, or Firm*—Gloria K. Koenig

[57] ABSTRACT

A high torque windmill is provided for use in converting wind power to usable energy, having a vertical axis about which a plurality of flexible vanes are journaled for rotation and spaced radially therefrom. The vanes are circumferentially spaced and mounted on a rigid circular, multi-sided support member which comprises the rotor journaled for rotation about the vertical mounting axis. Each vane comprises a conical member made of a dacron material and open at opposed ends thereof. A plurality of rods are held in pockets located about the conical surface for maintaining the desired conical configuration. These rods extend beyond each pocket at the smaller end of the cone, for fitting into tubular members fastened to the rotor to hold the vanes in place. Adjacent vanes are offset from the plane of rotation by 15 degrees in opposite directions (that is, up and down) in order to maximize the amount of captured wind power. The foregoing design provides a low speed high torque multi-directional windmill unit.

11 Claims, 7 Drawing Figures

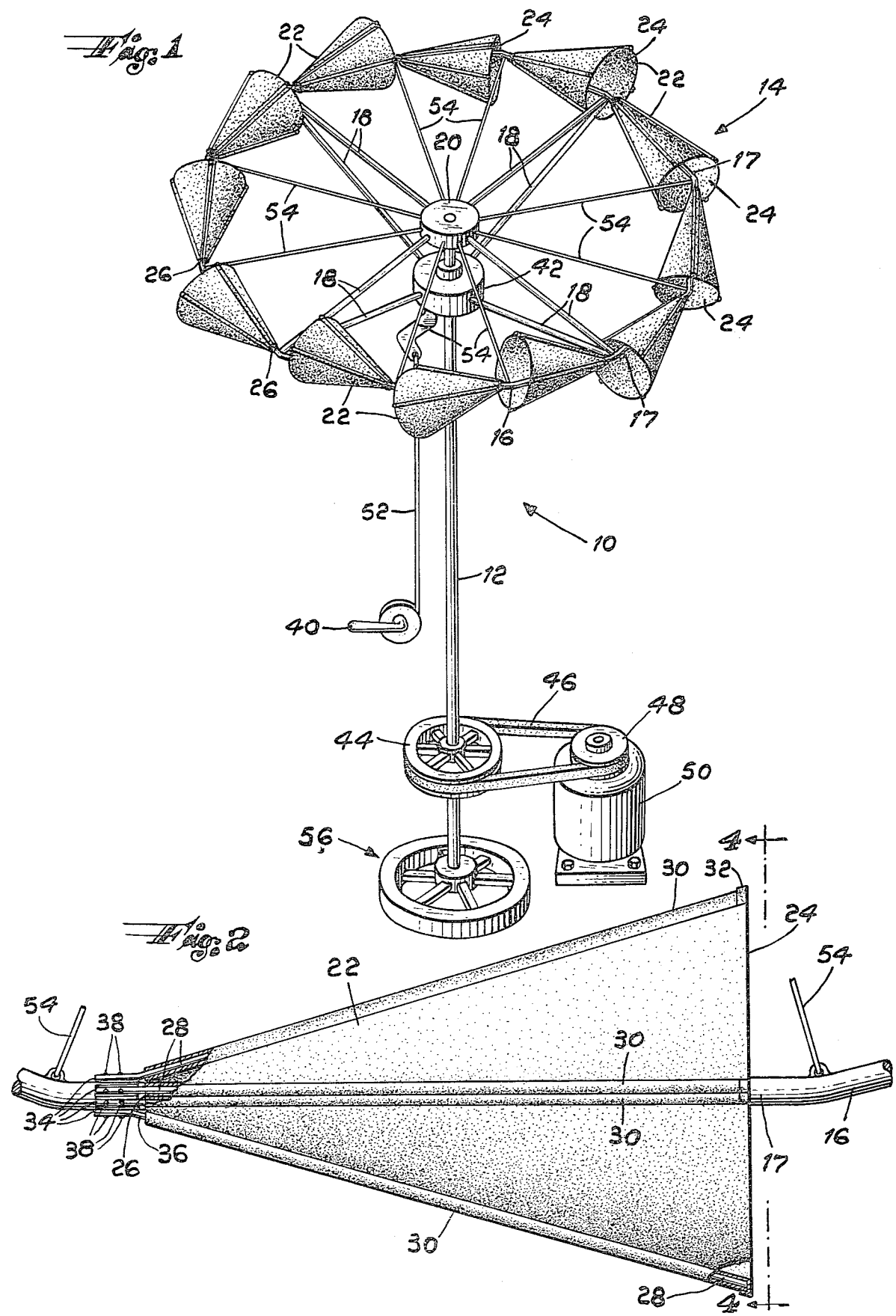

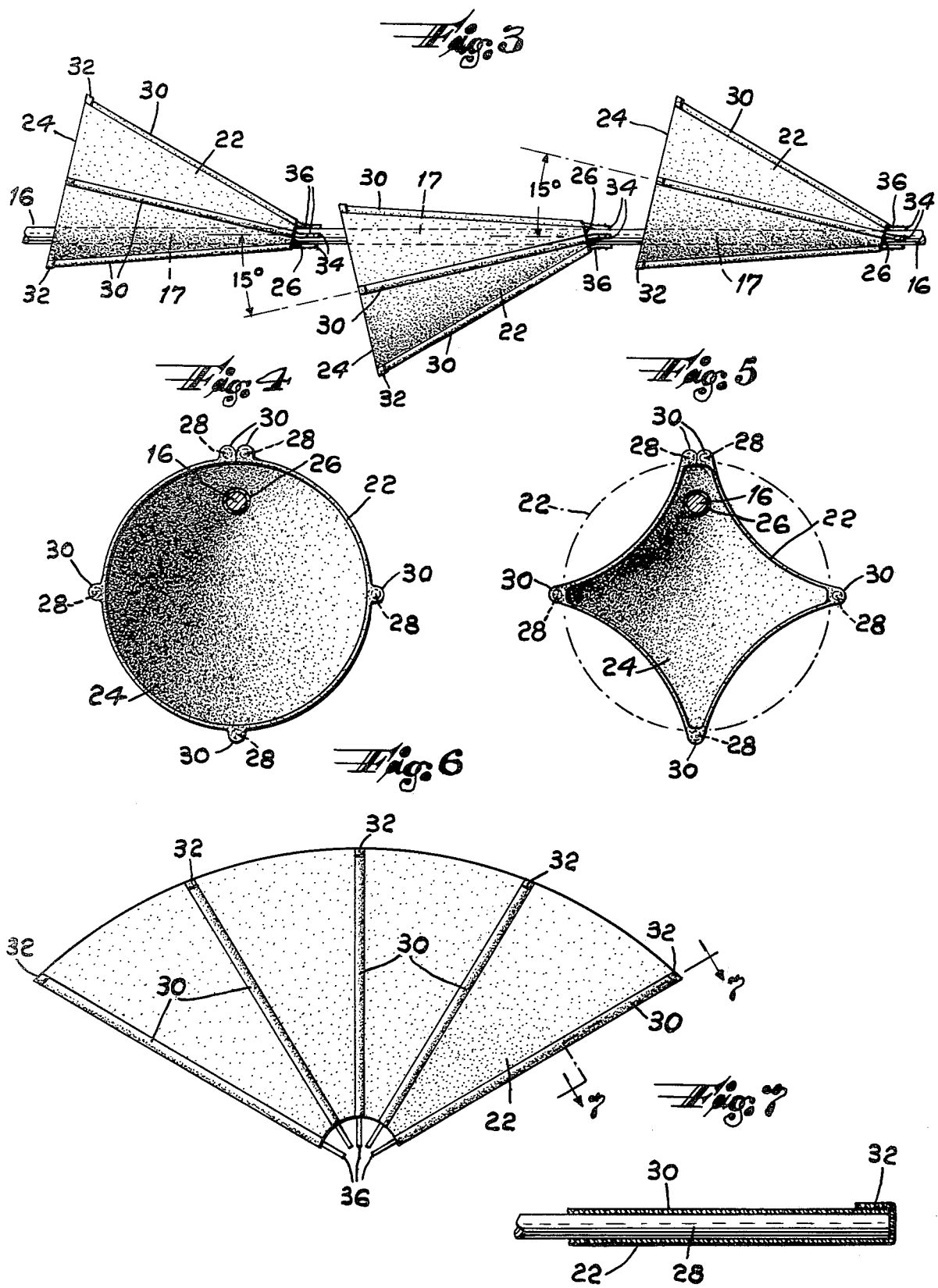

WIND POWER CONVERTER

BACKGROUND OF THE INVENTION

1. Field of the Invention

The present invention relates to wind power converters and more particularly to windmills that are multi-directional and produce relatively high torque at low speeds of rotation.

2. Description of the Prior Art

Windmills have been known for a long time and are used to generate energy by converting wind power into useful forms of energy. They have been employed to turn wheels, to pump water, to turn generators, to produce electricity. Their use as a common way to produce electricity has not progressed for a number of reasons, including the fact that electricity has been relatively cheap to purchase.

While windmills have been known to generate high torque outputs, this usually has required that they turn at fairly high r.p.m.s. It is also desirable to develop a maximum torque in varying wind conditions. Further, some windmills are subject to severe damage during high winds. Thus, it is desirable to provide a windmill constructed to prevent significant damage during these high winds.

SUMMARY OF THE INVENTION

The windmill according to the present invention is designed primarily to generate high shaft torque output at very low as well as high wind velocities.

The present windmill construction is capable of producing a high torque at a slower speed of rotation, and in increasing the amount of air pressure normally obtainable with conventional flat surface vane designs.

A windmill according to the present invention is particularly useful for driving a heat pump or other type of generator, and may be mounted on a roof for use in a home or on a tower.

A high torque windmill is provided for use in converting wind power to usable energy, having a vertical axis about which a plurality of flexible vanes are journaled for rotation and spaced radially therefrom. The vanes are circumferentially spaced and mounted on a rigid circular multi-sided support member which comprises the rotor journaled for rotation about the vertical mounting axis. Each vane comprises a conical member made of a dacron material and open at opposed ends thereof. A plurality of rods are held in pockets located about the conical surface for maintaining the desired conical configuration. These rods extend beyond each pocket at the smaller end of the cone, for fitting into tubular members fastened to the rotor to hold the vanes in place. Adjacent vanes are offset from the plane of rotation by 15 degrees in opposite directions (that is up and down) in order to maximize the amount of captured wind power. The foregoing design provides a low speed high torque multi-directional windmill unit.

The above advantages and objects of this invention will become more apparent when considered with the details of construction and operation as more fully described hereinafter and illustrated in the accompanying drawings wherein like numerals refer to like parts throughout.

BRIEF DESCRIPTION OF THE DRAWINGS

FIG. 1 is an elevation view in perspective of a preferred embodiment of the windmill according to the present invention;

FIG. 2 is an enlarged elevation view of the conical vane used in the windmill of FIG. 1;

FIG. 3 is an enlarged elevation view of the offset relationship of the conical vanes employed in the present invention;

FIG. 4 is an end view of the conical vane taken substantially on the line 4—4 of FIG. 2;

FIG. 5 is an end view of the conical vane according to this invention showing the upwind and downwind configuration;

FIG. 6 is a plan view of conical vane prior to assembly for mounting on the windmill unit; and FIG. 7 is a cross-sectional view taken substantially on the line 7—7 of FIG. 6, showing the stay-rods mounted in surface pockets of the conical vane.

DETAILED DESCRIPTION OF THE INVENTION

Referring now more specifically to the drawings, there is shown in FIG. 1 a windmill unit 10 constructed and arranged according to the present invention. The windmill 10 includes an upright or vertically-disposed axle 12 from which a rotor assembly 14 is journaled for rotation with the axle 12 about a vertical axis.

The rotor assembly 14 includes a generally circular rigid member 16 which has the shape of a wheel having a plurality of rigid spokes 18 extending between a central hub 20 and the outer member 16 outwardly radially disposed of the hub. The outer rigid member 16 is preferably in the form of an equilateral polygon having a plurality of straight sides 17 (e.g. twelve sides) arranged in a circle. The sides 17 may be suitably interconnected by welding or the like. Mounted on the rotor member 16 are a plurality of flexible vanes 22, each of which are substantially identical. The vanes are equally spaced about the circumference of the rotor assembly on member 16. While twelve vanes are shown the particular number selected may vary with the windmill design. Each vane comprises a tapered or a conical shape and is made of a suitable material such as dacron, which is characterized by strength and durability to the weather environment in which it is located. The cone is open at opposite ends as shown at 24, 26 and is maintained in its conical configuration by means of a plurality of stay rods 28, made of aluminum or other suitable metal. The rods may be covered with plastic tubing (not shown) to reduce friction and corrosion. These rods are disposed equidistant about the outer circumference of the cone and are held in pockets or channels 30 formed in the cone. These pockets extend between opposite ends of the cone and are fastened to the basic cone surface by appropriate means such as stitching used in making sails for boats. The pockets are open at the smaller end and are capped or sealed by a secured flap or cover 32 to prevent the rod from passing completely through the pocket. After the rods are inserted into the pockets, the cone is brought from its laid-out position of FIG. 6, into a surrounding position about the peripheral support 16 of the rotor assembly (see FIG. 4). The rods extend beyond the cone at the open end of the surface pockets, and are constructed and arranged to be received by tubular holders 34 which are secured about the support 16 at predetermined locations. The holders comprise a relatively short tubular member having an inner diameter that will frictionally engage the rod extensions as they are inserted into the holder. At each location there are a plurality of holders 34 fastened securely about the support 16 (e.g. by brazing, welding, etc.), which correspond to the number of rods used to form the cone. The holders are arranged so that when the corresponding rod extension is inserted therein (e.g. see FIG. 2) the conical-shaped vane will be formed and maintained. Set screws 38 can be used to securely hold the rods in their prespective holders. The ends of the rods are slightly bent as shown at 36 in order to mate with the holder 34 and orient the conical vane in the desired position.

It is preferred that adjacent cones be offset from the horizontal plane of rotation by about fifteen degrees. This is best illustrated in FIG. 3. The desired arrangement can be accomplished in a variety of ways, for example, by bending the extended rod ends so that the cone orientation relative to the plane of rotation is fifteen degrees up or down. This will insure that the cones will capture the maximum amount of wind and prevent slip stream drag.

The vertical axis of rotation 12 typically may comprise a plurality of interconnected axles, although for simplicity a single axle is shown. The upper end of axle 12 is secured with the rotor hub 20 so that the axle turns with the rotor assembly. Also, the axle may have a standard brake, as generally shown at 42, associated with it to render the unit inoperable or to stop it from rotating when desired, such as for repair and the like. In addition, a centrifugal governor (not shown) may be mounted with the brake to control the rotation of the axle under high wind conditions. Hydraulic braking may be used if preferred. If the windmill unit is to be mounted for home use then suitable brackets and angle supports (not shown) may be employed to mount the axle 12 vertically above the roof peak. The windmill also can be mounted on a separate tower if desired.

At the lower end of the axle is a drive pulley 44 from which a heat pump or generator 50 can be driven. When used with a heat pump the usable energy is increased 3.4 fold. The drive pulley may be interconnected by means of one or more belts 46 and a clutch 48, and will cause the generator to produce useful energy output, e.g., electricity, which in turn can be used to run other equipment in the home. The brake is provided with a conveniently accessible actuator 40 connected via cable 52, for engaging the brake when desired.

A heavy inertia fly wheel and governor shown generally at 56, may be operationally mounted above or below the drive pulley 44 on the axle 12 to moderate and govern the speed of rotation of the rotor assembly in erratic wind conditions.

As the conical vanes capture the wind in a downflow direction (i.e., from the larger to the smaller opening) the impact of the wind on the flexible material will cause those cones to assume the conical inflated configuration as shown by the dotted lines in FIG. 5. Those cones, which are oriented on the rotor assembly to receive the wind in an upflow direction (i.e. from the small to the larger opening), will assume a partially collapsed shape shown by the solid lines in FIG. 5. In the latter case the cone portions between the rod stays have a concave configuration. The upwind cones will have a drag resistance of about 15% of that which a fully open cone would have travelling in the same direction. It has been established that the conical vanes provide a significantly greater amount of air pressure and thus, usable energy, than a flat surface vane.

While the rotor assembly is illustrated with a multi-sided rigid support, it also is within the scope of this invention to use a circular rigid support for the flexible conical vanes. If necessary, the rotor may have a plurality of guy wires (shown at 54 in FIG. 1) extending between the central hub and the outer support. This will make the rotor more rigid as an integral unit. The tension on these wires may be adjusted by means of standard turnbuckles (not shown), and the number of wires employed will depend upon the desired rigidity and design of the rotor assembly.

Further, two or more rotor assemblies 14 may be stacked or mounted parallel to each other along the axle 12 to increase the energy output of the windmill. The foregoing is considered as illustrative only, and while specific embodiments have been described with some particularity, many modifications and variations of those embodiments will occur to those skilled in the art without deviating from the invention. Accordingly, it is to be understood that, within the scope of the appended claims, the invention may be practiced other than as specifically described or shown.

What is claimed herein is:

1. A windmill for capturing wind comprising:
   (a) a rotor assembly mounted for rotation about a first axis;
   (b) said rotor assembly including a plurality of vane means radially spaced from said first axis at the periphery of said assembly and circumferentially spaced thereabout;
   (c) each of said vane means being flexible and comprising a tapered configuration open at opposite ends thereof and having a substantially, continuous outer surface extending between said ends; and
   (d) a plurality of rigid elongated rods spaced about the outer surface of each of said vane means, for substantially maintaining said tapered configuration of each of said vane means in response to impact with said wind.

2. A windmill in accordance with claim 1 wherein said rods extend beyond one of the ends and are secured to said periphery of said rotor assembly for holding said vane means in its desired position.

3. A windmill in accordance with claim 1 wherein each of said vane means is offset a predetermined amount from the plane of rotation of said rotor assembly.

4. A windmill in accordance with claim 3 wherein adjacent ones of said vane means are offset in opposite directions from said plane of rotation.

5. A windmill in accordance with claim 4 wherein said offset is about fifteen degrees.

6. A windmill in accordance with claim 1 wherein said flexible vane means each includes a plurality of pockets extending between said opposite ends disposed about the outer surface of said vane means, and a plurality of rigid rods in each of said pockets, a portion of said rod extending out of said pocket and beyond the adjacent end of said vane means, and means for securing said extended end of each of said rods with said rotor assembly.

7. A windmill in accordance with claim 2 including a plurality of tubular members circumferentially spaced about the periphery of said rotor assembly, each of said tubular members securely engaging a corresponding one of the extensions of said rods.

8. A windmill in accordance with claim 7 wherein said rotor assembly comprises a central hub and an outer radially located substantially circular rim and a plurality of rigid spokes connected between said hub and said rim.

9. A windmill in accordance with claim 8 wherein said flexible vane means comprises a plurality of hollow conically-shaped vanes circumferentially spaced about said rim, means for securing said vanes to said rim in a predetermined offset position relative to the plane of rotation of said rotor assembly, and a plurality of rigid members operably associated with each of said vanes for facilitating capture of said wind in any direction.

10. A windmill in accordance with claim 9 wherein the outer surface of each of said vanes comprises a flexible material and includes a plurality of pockets for holding said rigid members.

11. A windmill in accordance with claim 10 wherein each of said pockets extends between opposite ends of said vane and has a closed end and an open end through which said rigid member extends.

* * * * *